United States Patent
Gruden et al.

[11] Patent Number: 5,847,474
[45] Date of Patent: Dec. 8, 1998

[54] LORENTZ FORCE ACTUATOR

[75] Inventors: James M. Gruden, Centerville; Ned L. Kikly, Vandlia, both of Ohio

[73] Assignee: ITT Automotive Electrical Systems, Inc., Auburn Hills, Mich.

[21] Appl. No.: 349,435

[22] Filed: Dec. 5, 1994

[51] Int. Cl.⁶ .................................................. H02K 41/00
[52] U.S. Cl. ............................ 310/14; 310/12; 310/23; 310/30; 123/90.11
[58] Field of Search ................... 310/12, 14, 23, 310/30, 90; 123/90.11

[56] References Cited

U.S. PATENT DOCUMENTS

| | | | |
|---|---|---|---|
| 4,243,899 | 1/1981 | Jaffe | 310/14 |
| 4,602,848 | 7/1986 | Honds et al. | 350/247 |
| 4,620,253 | 10/1986 | Garwin et al. | 360/107 |
| 4,625,618 | 12/1986 | Hawanick | 89/8 |
| 4,631,430 | 12/1986 | Aubecht | 310/12 |
| 4,906,878 | 3/1990 | Twaalfhoven et al. | 310/12 |
| 4,927,203 | 5/1990 | Mayer et al. | 292/201 |
| 4,977,549 | 12/1990 | Berg | 369/13 |
| 4,979,542 | 12/1990 | Mesenich | 137/625.65 |
| 5,072,144 | 12/1991 | Saito et al. | 310/12 |
| 5,080,627 | 1/1992 | Oriya et al. | 446/444 |
| 5,317,220 | 5/1994 | Godkin | 310/12 |
| 5,515,818 | 5/1996 | Born | 123/90.11 |

*Primary Examiner*—Thomas M. Dougherty
*Assistant Examiner*—K. Eizo Tamai
*Attorney, Agent, or Firm*—Jacox, Meckstroth & Jenkins

[57] ABSTRACT

A linear actuator powered by a Lorentz force. The force is generated by passing an electrical current through an armature spanning a space across a magnetic field established between two permanent magnets. The armature is mounted upon a slider extending between a pair of electrically conductive rails. Reversible linear motion is achieved by switching the polarity of an electrical potential applied across the two rails.

11 Claims, 2 Drawing Sheets

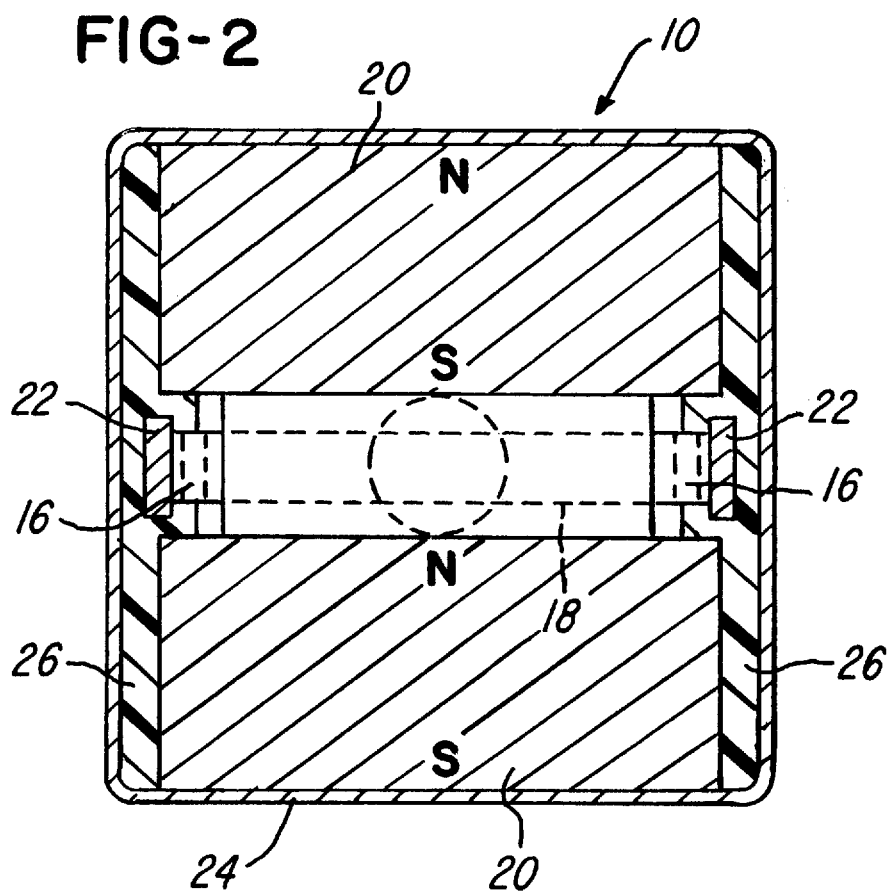

LORENTZ FORCE ACTUATOR

BACKGROUND OF THE INVENTION

This invention relates to the field of linear actuators and has particular application to actuators for power locks in automobile doors. Actuators for automobile door locks are generally powered by an electrical solenoid a pneumatic system, or a small electrical motor. These are mass production items which are sold in a fiercely competitive market place. Manufacturers of door lock actuators for automotive and similar applications are under constant pressure to reduce costs while improving quality.

Thus there is a need for an improved linear actuator having a small size, a minimum number of moving parts and a low noise level.

SUMMARY OF THE INVENTION

This invention provides a linear actuator which generates a force for driving an actuating arm along a straight line between, and parallel to, a pair of parallel and electrically conductive rails. The actuating arm is driven by a slider which rides between the rails on a pair of sliding electrical contacts. There is an electrically conductive armature carried by the slider and extending between the sliding electrical contacts. An electrical potential is applied to the two rails, so that an electrical current flows through the armature.

A pair of permanent magnets are mounted orthogonally adjacent the rails and generate a magnetic field extending perpendicularly to the direction of the current flowing through the armature. This creates a Lorentz force which acts upon the armature in a direction parallel to the rails. The force, so generated, drives the slider along the rails, carrying the actuating arm as it goes. The direction of the sliding movement may be reversed by reversing the direction of current flow through the armature.

In the preferred embodiment there is a ferromagnetic sleeve mounted upon the slider so as to surround the armature and concentrate the magnetic flux in that particular region. This increases the Lorentz force acting upon the armature. Also, a ferromagnetic casing may surround the actuator to provide a path for magnetic flux return to the magnets.

It is therefore an object of the invention to provide an improved linear actuator.

It is another object of the invention to provide improved actuation means for an automobile door lock.

Other objects and advantages of the invention will be apparent from the following description, the accompanying drawings and the appended claims.

BRIEF DESCRIPTION OF THE DRAWING

FIG. 2 is a cross-section taken along lines 2—2 of FIG. 1.

DESCRIPTION OF THE PREFERRED EMBODIMENT

Figure 1:
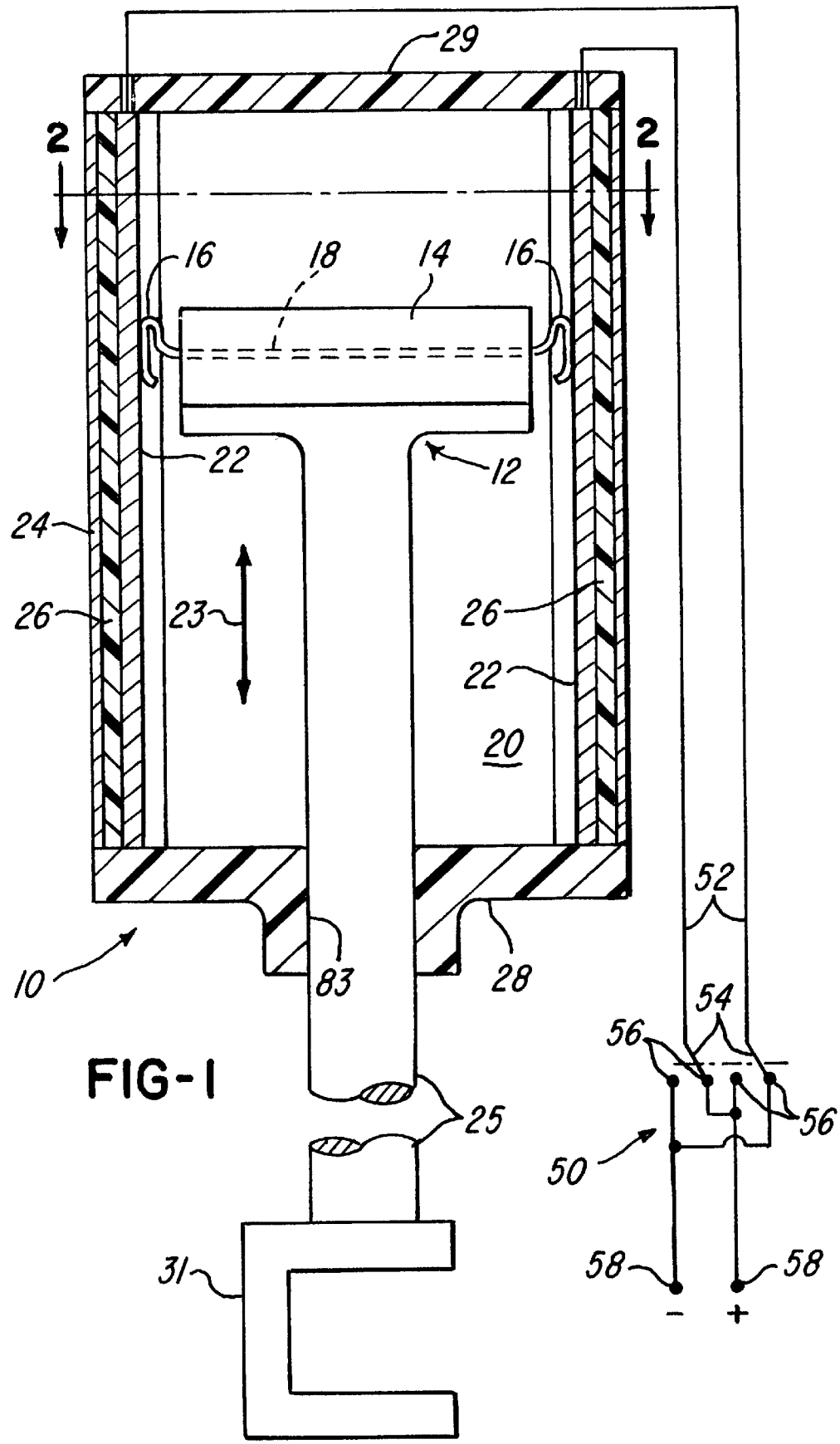
FIG. 1 is a cross section view of a Lorentz force actuator, looking in a direction parallel to the magnetic field.

An actuator according to the present invention may be constructed in the form illustrated in FIGS. 1 and 2 and as generally indicated by reference numeral 10. As best illustrated in FIG. 1, actuator 10 has a slider 12 which rides between a pair of parallel rails 22 in a reversible linear direction as indicated by the arrow 23. An actuating arm 25 is carried by slider 12 and extends downwardly through an opening 83 in an end cap 28. A connector 31 or similar device may be mounted on or integrally formed as part of the actuating arm 25. The top of actuator 10 is closed out by a top cap 29.

Slider 12 comprises an electrically conductive armature 18 encased within a ferromagnetic sleeve 14 and extending between a pair of sliding electrical contacts 16, 16. Rails 22, 22 are supported by a plastic molding 26 and are in electrical contact with sliding contacts 16, 16.

When an electrical potential is applied across rails 22, 22 a current flows through sliding contacts 16, 16 and armature 18. For this purpose a electrical potential may be applied to a pair of input terminals, 58, 58 and transferred to four terminals 56 within a double-pole-double-throw switch 50. A pair of switch contacts 54, 54 may be connected to a pair of lead lines 52, 52 which are connected to rails 22, 22.

It will be seen that the polarity of the potential applied across rails 22, 22 may be reversed by changing the position of switch 50. It will be appreciated that numerous types of switching arrangements are available for such an application and that double-pull-double-throw switch 50 is shown only for purposes of illustration. This invention may employ any electrical driver capable of applying a voltage across rails 22, 22 and selectively switching the polarity of that voltage.

Referring now to FIG. 2, armature 18 is positioned orthogonally between a pair of permanent magnets 20, 20. Magnets 20, 20 are linearly polarized in such a fashion as to create a magnetic field extending perpendicular to the direction of current flow through armature 18.

When an electrical current flows through armature 18 it reacts with the magnetic field in a well known manner to generate a force known as a Lorentz force. This force acts upon armature 18 in a direction perpendicular to a plane defined by the magnetic field lines and the direction of current flow through the armature 18. That plane is parallel to the plane of FIG. 2, and the Lorentz force acts in the direction of arrow 23 of FIG. 1. When magnets 20, 20 have the polarity illustrated in FIG. 2 and switch 50 is in the position illustrated in FIG. 1, the Lorentz force acts downwardly. Reversing switch 50 creates an upwardly acting force. In either case the force per unit length of armature 18 has a magnitude equal to the vector cross product J×B, where J is the current and B is the magnetic flux density.

The magnetic induction is locally increased in the region of armature 18 by the presence of the ferromagnetic sleeve 14. Actuator 10 may be housed within a flux ring in the form of a ferromagnetic housing 24 which provides a return path for the magnetic flux passing between magnets 20, 20.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A linear actuator comprising;
   a. a pair of electrically conductive, parallel rails;
   b. a slider extending between said parallel rails, said slider comprising a pair of electrically conductive sliding contacts engaging said rails, and an electrically conductive armature connected to said sliding contacts and extending therebetween;
   c. an actuator arm secured to said slider and extending in a direction parallel to said rails;
   d. a pair of permanent magnets facing said slider and magnetized to create a magnetic field extending across said armature, wherein (1) said pair of permanent magnets includes a first magnet and a second magnet, (2) each of said first magnet and said second magnet has a first side which has a first polarity and a second side which has a second polarity, (3) said first polarity is opposite of said second polarity, (4) said first side of said first magnet faces said slider, (5) said second side of said second magnet faces said slider, and (6) said slider is interposed between said first side of said first magnet and said second side of said second magnet during operation of said linear actuator; and e. means for applying an electrical potential across said rails thereby producing a current flow through said armature and generating a Lorentz force for driving said slider and said actuating arm in the direction of extent of said actuator arm.

2. An actuator according to claim 1 further comprising a ferromagnetic sleeve adjacent said armature for increasing the strength of said magnetic field in a region thereabout.

3. An actuator according to claim 2 further comprising a flux ring in the form of a ferromagnetic housing surrounding said magnets and said slider.

4. An actuator according to claim 3 further comprising a plastic molding encased by said housing and supporting said rails and said magnets.

5. A method for actuating an actuator, comprising:

slidably mounting an actuator arm between a plurality of electrically conductive rails; conductive rails, said actuator arm comprising a slider electrically engaging said plurality of rails;

mounting a first magnet and a second magnet around said actuator arm to permit said actuator arm to slide between a first sidewall of said first magnet which has a first polarity and a second sidewall of said second magnet which has a second polarity, wherein said first polarity is opposite of said second polarity;

using said said first magnet and said second magnet to create a magnetic field across said actuator arm; and applying an electrical potential across said rails to produce a current flow through said actuator arm to generate a Lorentz force for driving said armature in a direction which is substantially parallel to said current flow.

6. The method as recited in claim 5 wherein said plurality of electrically conductive rails are generally parallel.

7. The method as recited in claim 5 wherein said mounting step further comprises the step of mounting said actuator arm in a ferromagnetic sleeve for increasing the strength of said magnetic field in a region thereabout.

8. The method as recited in claim 5 wherein said method further comprises the steps of:

coupling said actuator arm to an automobile door lock such that said actuator arm can actuate said door lock.

9. The method as recited in claim 5 wherein said method further comprises the step of:

encasing said actuator arm and said plurality of rails in a plastic molding.

10. An actuator according to claim 1, wherein:

said pair of electrically conductive parallel rails defines a space therebetween, and said slider is movably located within said space.

11. An actuator according to claim 1, wherein:

said pair of electrically conductive parallel rails includes a first rail and a second rail, said pair of electrically conductive sliding contacts includes a first contact and a second contact, said first contact continuously contacts said first rail during operation of said linear actuator, and said second contact continuously contacts said second rail during operation of said linear actuator.

\* \* \* \* \*